(12) United States Patent
Lewis et al.

(10) Patent No.: US 6,755,403 B2
(45) Date of Patent: Jun. 29, 2004

(54) NON-SLIP STA-BAR BUSHING

(75) Inventors: James Lewis, Sandusky, OH (US); Richard Novy, West Lake, OH (US); Robert Missig, Berlin Heights, OH (US)

(73) Assignee: The Pullman Company, Milan, OH (US)

( * ) Notice: Subject to any disclaimer, the term of this patent is extended or adjusted under 35 U.S.C. 154(b) by 57 days.

(21) Appl. No.: 10/075,062

(22) Filed: Feb. 13, 2002

(65) Prior Publication Data

US 2002/0121733 A1 Sep. 5, 2002

Related U.S. Application Data

(63) Continuation-in-part of application No. 09/408,406, filed on Sep. 29, 1999, now abandoned.

(51) Int. Cl.[7] ................................................. F16F 7/00
(52) U.S. Cl. .................. 267/141; 267/140.12; 267/152; 280/124.106
(58) Field of Search ............................. 267/141, 141.2, 267/140.11, 140.12, 140.13–140.15, 152, 35, 153; 280/124.106, 124.1

(56) References Cited

U.S. PATENT DOCUMENTS

| | | |
|---|---|---|
| 1,552,645 A | 9/1925 | Powell |
| RE17,136 E | 11/1928 | Harris |
| 1,827,267 A | 10/1931 | Short |
| 1,983,796 A | 12/1934 | Geyer |
| 3,230,000 A | 1/1966 | Simpson |
| 3,392,971 A | 7/1968 | Herbenar et al. |
| 3,572,677 A | 3/1971 | Damon |
| 3,642,268 A | 2/1972 | Hipsher |
| 4,377,216 A | 3/1983 | Ueno |
| 4,513,990 A | 4/1985 | Morita et al. |
| 4,700,934 A | 10/1987 | Andra et al. |
| 4,786,036 A | 11/1988 | Kanda |
| 4,834,351 A | 5/1989 | Firma Carl Freudenberg et al. |
| 4,854,561 A | 8/1989 | Kanda |
| 4,858,899 A | 8/1989 | Saotome et al. |
| 4,883,287 A | 11/1989 | Murakami et al. .......... 280/665 |
| 4,916,749 A | 4/1990 | Urban et al. |
| 4,927,122 A | 5/1990 | Brumme et al. |
| 5,005,810 A | 4/1991 | Sawada et al. |
| 5,013,012 A | 5/1991 | Jouade |
| 5,172,893 A | 12/1992 | Bouhier et al. |
| 5,188,346 A | 2/1993 | Hamada et al. |
| 5,280,885 A | 1/1994 | Noguchi |
| 5,288,059 A | 2/1994 | Gautheron et al. |
| 5,328,160 A | 7/1994 | McLaughlin |
| 5,397,112 A | 3/1995 | Roth et al. |
| 5,743,987 A | 4/1998 | Tang et al. ............. 156/244.11 |
| 5,879,026 A | 3/1999 | Dostert et al. ............... 280/781 |

*Primary Examiner*—Pam Rodriguez
(74) *Attorney, Agent, or Firm*—Harness, Dickey & Pierce, PLC

(57) ABSTRACT

A stabilizer bar assembly has a stabilizer bar and a pair of bushing assemblies. Each bushing assembly has an elastomeric bushing disposed around the stabilizer bar and an outer metal member disposed around the elastomeric bushing. The outer metal member compresses the elastomeric bushing between the stabilizer bar and the outer metal member to a prespecified percent of compression. When the stabilizer bar rotates with respect to the outer metal member, the compression of the elastomeric bushing stops movement between the elastomeric bushing and the stabilizer bar and between the elastomeric bushing and the outer metal member. A fastening strap is attached to the outer metal member to attach the stabilizer bar assembly to a vehicle.

27 Claims, 1 Drawing Sheet

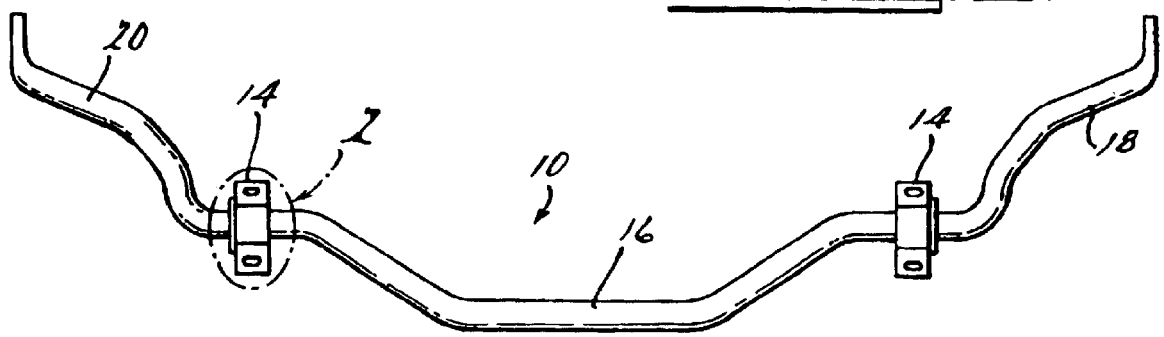
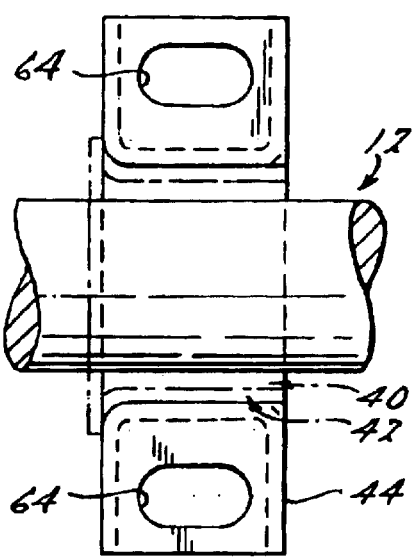
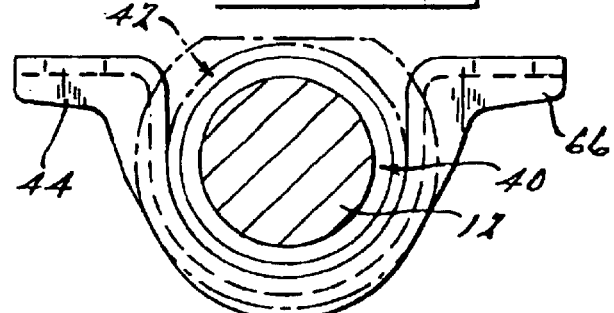
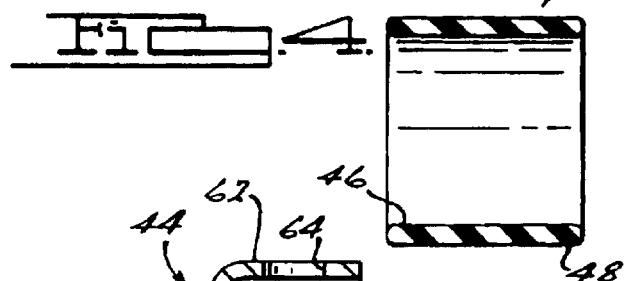
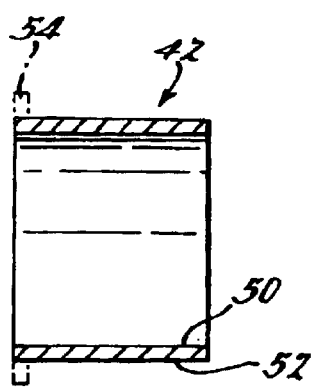
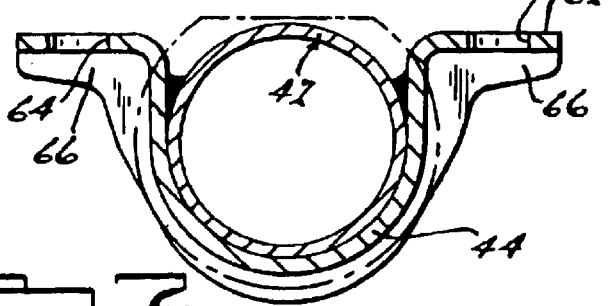

NON-SLIP STA-BAR BUSHING

CROSS-REFERENCE TO RELATED APPLICATIONS

This application is a continuation-in-part of U.S. patent application Ser. No. 09/408,406 filed Sep. 29, 1999, now abandoned.

FIELD OF THE INVENTION

The present invention relates to stabilizer bar bushings. More particularly, the present invention relates to a stabilizer bar bushing which incorporates anti-slip features to eliminate slip between the bushing and the stabilizer bar.

BACKGROUND OF THE INVENTION

Conventional motor vehicle suspension systems often include one or more stabilizer bars to control the degree of roll of the motor vehicle during cornering or other vehicle maneuvers. A typical stabilizer bar is generally U-shaped having a long intermediate portion disposed laterally with respect to the motor vehicle and a pair of relatively short end portions extending forwardly or rearwardly to connect to a corresponding pair of suspension arms or wheel hubs. The intermediate portion normally is connected to the underside of the vehicle by one or more bracket assemblies.

The mounting bracket assembly for the intermediate portion of the stabilizer bar typically includes an elastomeric bushing, sometimes termed an insulator, and a bracket which is secured to the underside of the vehicle. The elastomeric bushing is located between the stabilizer bar and the bracket to support and isolate the stabilizer bar. In some applications it is desirable to use an elastomeric bushing that permits the stabilizer bar to rotate freely about the axis of the intermediate portion of the stabilizer bar. In other applications, it is desirable to allow partial wind-up of the bushing and then allowing the bushing to slip for relative torsional travel between the bushing and the bar. In still other applications, attempts are made to eliminate the slippage of the bushing such that all rotation of the stabilizer bar is resisted by wind-up of the bushing.

The designs that allow rotation between the bar and the bushing have attempted to minimize friction at the bushing/stabilizer bar interface by employing low-friction materials as liners covering the bore of the bushing or by adding lubricants between the bushing and the stabilizer bar. Commonly used materials for bushing liners are polyester or polytetra fluoroethylene while silicone greases have been utilized as lubricants. The primary disadvantage of these designs is that the liner wears or the lubricant dissipates resulting in an unacceptable audible squawk in the vehicle. Also, with these designs, environmental contamination can result in premature wear of the liner or premature dissipation of the lubricant thus leading to the audible squawk.

The designs that allow partial wind-up and then allow slippage of the stabilizer bar with respect to the bushing suffer from the same disadvantages as the designs that allow total rotation in that early wear and/or contamination of the interface between the bar and the bushing can lead to an audible squawk.

The designs that attempt to eliminate all slippage of the bushing have been successful for limited rotation of the stabilizer bar with respect to the bushing, but larger rotation of the stabilizer bar has caused deterioration of the bushing and/or slippage of the bushing. In order to overcome these problems, some prior art designs have incorporated flats on the stabilizer bar or other components which resist rotation of the bushing. While the incorporation of flats has resisted the larger amounts of rotation, the costs and complexities of these designs have limited their applicability.

The continued development of stabilizer bar bushings and attachment systems has been directed toward designs which provide additional durability, eliminate the audible squawking by eliminating the rotation between the stabilizer bar and the bushing but yet still perform the required isolation between the stabilizer bar and the vehicle.

SUMMARY OF THE INVENTION

The present invention provides the art with an attachment between the stabilizer bar and the supporting structure of the vehicle which will improve the durability of the bushing, provide isolation for the stabilizer bar and allow for the proper positioning of the stabilizer bar relative to the frame. The present invention provides for radial, axial, torsional and conical loading of the stabilizer bar due to jounce and rebound of the suspension. The present invention provides this relative movement between the stabilizer bar and the frame without slippage between the bushing and the stabilizer bar thus eliminating the potential for an audible squawk.

The present invention utilizes a mechanically bonded bushing assembled over the stabilizer bar and then compressed into an outer sleeve/bracket assembly. The bracket assembly is provided with slotted holes to compensate for the stabilizer bar assembly and the vehicle body tolerance stack-ups. This preassembly of the bushings and the stabilizer bar also allows the assembly to be supplied directly to the assembly plants ready for vehicle assembly. This is opposed to the prior art which supplies the stabilizer bar and the bushings as separate components requiring sub-assembly at the vehicle assembly plant. The stabilizer bar attachment of the present invention provides both axial and lateral location proximate to the vehicle body and suspension attachments, the torsional resistance of the elastomeric member provides enhanced anti-roll capabilities, and due to the lack of slippage between the elastomeric member and the bore, a noise free pivot attachment with enhanced longevity and product life is provided.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 1 is a plan view of a stabilizer bar assembly incorporating the unique bushing assembly in accordance with the present invention;

FIG. 2 is an enlarged view of the bushing assembly in accordance with the present invention;

FIG. 3 is an end view of the bushing assembly shown in FIG. 2;

FIG. 4 is a cross-sectional view of the elastomeric bushing for the bushing assembly of the present invention;

FIG. 5 is a cross-sectional view of the outer tube for the bushing assembly of the present invention;

FIG. 6 is a cross-sectional view of the strap for the bushing assembly of the present invention; and FIG. 7 is an end view of a typical strap and outer metal member for the assembly of the present invention.

DETAILED DESCRIPTION OF THE PREFERRED EMBODIMENT

Referring now to the drawings in which like reference numerals designate like or corresponding parts throughout the several views, there is shown in FIG. 1 a stabilizer bar assembly which is identified generally by the reference numeral 10. Stabilizer bar assembly 10 comprises a stabilizer bar 12 and a pair of bushing assemblies 14. Stabilizer bar 12 is a generally U-shaped bar having a center sectional 16 and a pair of end sections 18 and 20. Center section 16 is designed to be secured to the sprung mass of the vehicle by bushing assemblies 14. End sections 18 and 20 are designed to be secured to the left and right suspension control arms or hubs (not shown) of the vehicle to which stabilizer bar assembly 10 is designed for. The various bends and unique configurations for stabilizer bar 12 permit stabilizer bar assembly 10 to function in the particular vehicle without interfering with the components of the vehicle which are positioned within the general area of stabilizer bar assembly 10.

Referring now to FIGS. 2–7, bushing assembly 14 comprises an elastomeric bushing 40, an outer metal member 42 and a fastening strap 44. As shown in FIG. 4, elastomeric bushing 40 is an annular member which includes an inside diameter 46 having a specified dimension and an outside diameter 48 having a specified dimension. Inside diameter 46 is designed to be smaller than the bar diameter for stabilizer bar 12. Outside diameter 48 is designed to be larger than an inside diameter 50 of outer metal member 42 when elastomeric bushing 40 is assembled over stabilizer bar 12. This dimensioning provides a specified amount of compression for elastomeric bushing 40 to provide the mechanical friction between elastomeric bushing 40 and stabilizer bar 12 and between elastomeric bushing 40 and outer metal member 42. This mechanical friction allows for torsional wind-up and deflection of elastomeric bushing 40 to prevent any slippage between the mating components.

In the preferred embodiment, the percent compression for elastomeric bushing 40 after it is assembled over stabilizer bar 12 and within outer metal member 42 is between 20% to 60% compression and more preferably it is between 35% and 50%. When the percent of compression for elastomeric bushing 40 is less than 20%, slippage of elastomeric bushing 40 can occur. When the percent of compression for elastomeric bushing exceeds approximately 60%, the assembly of elastomeric bushing 40 and stabilizer bar 12 within outer metal member 42 becomes difficult and/or impractical.

Outer metal member 42 is a tubular member having a cylindrical body 52 defining inside diameter 50 and an optional flanged end 54 shown in phantom in the figures. While outer metal member 42 is illustrated in phantom as being provided with flanged end 54, it is within the scope of the present invention to provide outer metal member 42 with a non-flanged end. Flanged end 54 can be utilized to aid in the assembly of bushing assembly 14 onto stabilizer bar 12 if desired. In the preferred embodiment, outer metal member 42 is provided without flange 54 making outer metal member 42 a cylindrical tube. Fastening strap 44 comprises a C-shaped body 60 and a pair of flanges 62. C-shaped body 60 is sized to mate with the outside diameter of outer metal member 42 and as shown in FIG. 7. Fastening strap 44 is secured to outer metal member 42 by welding or other methods known in the art. Each flange 62 extends outward from body 60 and defines a slotted hole 64 which is used to secure stabilizer bar assembly 10 to the sprung mass of the vehicle. The slotting of holes 64 compensate for the various tolerance stack-ups which occur in the vehicle itself as well as the tolerances in stabilizer bar assembly 10. Each flange 62 may include a pair of gussets 66 which can provide support for securing stabilizer bar assembly 10 to the vehicle.

Once bushing assemblies 14 are assembled to stabilizer bar 12, stabilizer bar assembly 10 is ready to be assembled directly into the vehicle. This eliminates the prior art system of providing a separate stabilizer bar and bushings which require subassembly at the vehicle manufacturing plant prior to be assembled into the vehicle. Attempting to ship the prior art stabilizer bars as a complete assembly has resulted in the misplacement or loss of the bushings because of the lack of retention of the bushings to the stabilizer bar prior to being installed into the vehicle.

The assembly of bushing assemblies 14 onto stabilizer bar 12 places a pre-specified percent compression of elastomeric bushing 40. In the preferred embodiment, the percent compression of elastomeric bushing 40 is between 20% and 60% and more preferably it is between 35% and 50%. Due to the relatively high percent compression of elastomeric bushing 40, the slipping between elastomeric bushing 40 and stabilizer bar 12 and between elastomeric bushing and outer metal member 42 is eliminated for specific suspension travel requirements. Any pivoting or rotation of the stabilizer bar 12 during vehicle operation with respect to bushing assembly 14 causes wind-up or deflection of elastomeric bushing 40 without slipping between the components. Because the slipping between the components is eliminated, the potential for creating an audible squawk is eliminated. Due to the relatively high percent compression for elastomeric bushing 40, stabilizer bar 12 can rotate up to as much as 60° in either direction without slippage of elastomeric bushing 40. During suspension movement within a vehicle, the full jounce and full rebound positions of the suspension require that stabilizer bar 12 rotate less than this 60° allowable by bushing assembly 14 thus eliminating slippage of elastomeric bushing 40. In addition to eliminating slippage of elastomeric bushing 40, the high percent compression for elastomeric bushing 40 also improves steering response for the vehicle, it increases roll stiffness to improve vehicle handling, it enhances on-center steering response and on-center steadiness, it provides better high-speed lane-change stability, it improves overall vehicle handling and lateral stability, it enhances durability and it isolates stabilizer bar 12 and allows for the proper positioning of stabilizer bar 12 relative to the vehicle frame.

Another advantage of the high percent compression of elastomeric bushing 40 of bushing assembly 14 is the increase in the lateral/axial restraint of stabilizer bar 12 and the increase in the bending resistance for stabilizer bar 12. The increase in the lateral/axial restraint of stabilizer bar 12 causes stabilizer bar 12 to remain axially or laterally positioned during vehicle maneuvers. By maintaining the proper axial/lateral position, stabilizer bar 12 improves the vehicle handling characteristics. The increase in the bending resistance for stabilizer bar 12 provided by bushing assemblies 14 increases the pure torsional or rotational movement of stabilizer bar 12 with respect to bushing assemblies 14. This improves vehicle handling due to the fact that the pivot points or the axis of rotation for stabilizer bar 12 remain more nearly fixed in the radial loaded direction.

Stabilizer bar assembly 10 is manufactured in a unique manner for stabilizer bar assemblies. Once stabilizer bar 12 has been manufactured with the proper configuration, two elastomeric bushings 40 are located on stabilizer bar 12 at the proper location. Because inside diameter 46 is smaller than the bar diameter for stabilizer bar 12, the interference fit between bushings 14 and stabilizer bar 12 maintain the proper positioning for bushings 14. A respective outer metal member 42 is assembled over each elastomeric bushing 40 by compressing each elastomeric bushing 40 to a specified percent compression and then inserting each elastomeric bushing 40 within the respective outer metal member 42 to produce bushing assemblies 14. In the preferred embodiment, the percent compression for each elastomeric bushing 40 is between 20% and 60% and more preferably between 35% and 50%. Bushing assemblies 14 can be assembled separately or one at a time or bushing assemblies 14 can be simultaneously assembled. Once assembled, the highly compressed bushing assemblies 14 provide the advantages detailed above.

While the above detailed description describes the preferred embodiment of the present invention, it should be understood that the present invention is susceptible to modification, variation and alteration without deviating from the scope and fair meaning of the subjoined claims.

What is claimed is:

1. A stabilizer bar assembly comprising:
  a stabilizer bar;
  a first bushing assembly attached to said stabilizer bar, said first bushing assembly comprising:
    a first annular outer metal member disposed around said stabilizer bar; and
    a first elastomeric bushing engaging said first outer metal member and said stabilizer bar, said first elastomeric bushing having a prespecified percent compression such that all rotation between said stabilizer bar and said first outer metal member causes only deflection of said first elastomeric bushing.

2. The stabilizer bar assembly according to claim 1, wherein said first bushing assembly includes a mounting strap secured to said first outer metal member.

3. The stabilizer bar assembly according to claim 1, further comprising a second bushing assembly attached to said stabilizer bar, said second bushing assembly comprising:
  a second annular outer metal member disposed around said stabilizer bar; and
  a second elastomeric bushing engaging said second outer metal member and said stabilizer bar, said second elastomeric bushing having a prespecified percent compression such that all rotation between said stabilizer bar and said second outer metal member causes only deflection of said second elastomeric bushing.

4. The stabilizer bar assembly according to claim 3, wherein said first bushing assembly includes a first mounting strap secured to said first outer metal member and said second bushing assembly includes a second mounting strap secured to said second outer metal member.

5. A stabilizer bar assembly comprising:
  a stabilizer bar;
  a first bushing assembly attached to said stabilizer bar, said first bushing assembly comprising:
    a first outer metal member disposed around said stabilizer bar; and
    a first elastomeric bushing disposed between said first outer metal member and said stabilizer bar, said first elastomeric bushing having a prespecified percent compression such that all rotation between said stabilizer bar and said first outer metal member causes only deflection of said first elastomeric bushing, wherein said percent compression is between 20% and 60%.

6. A stabilizer bar assembly comprising:
  a stabilizer bar;
  a first bushing assembly attached to said stabilizer bar, said first bushing assembly comprising:
    a first outer metal member disposed around said stabilizer bar; and
    a first elastomeric bushing disposed between said first outer metal member and said stabilizer bar, said first elastomeric bushing having a prespecified percent compression such that all rotation between said stabilizer bar and said first outer metal member causes only deflection of said first elastomeric bushing, wherein said percent compression is between 35% and 50%.

7. A stabilizer assembly comprising:
  a stabilizer bar;
  a first bushing assembly attached to said stabilizer bar, said first bushing assembly comprising:
    a first outer metal member disposed around said stabilizer bar, said first outer metal member defining a first annular gap between said stabilizer bar and an inner surface of said first outer metal member; and
    a first elastomeric bushing compressingly disposed within said first annular gap, an outer surface of said first elastomeric bushing being fixed to said inner surface of said first outer metal member and an inner surface of said first elastomeric bushing being fixed to said stabilizer bar during all rotation of said stabilizer bar with respect to said first outer metal member due to compression of said first elastomeric bushing.

8. The stabilizer bar assembly according to claim 7, wherein said first bushing assembly includes a mounting strap secured to said first outer metal member.

9. The stabilizer bar assembly according to claim 7, further comprising a second bushing assembly attached to said stabilizer bar, said second bushing assembly comprising:
  a second outer metal member disposed around said stabilizer bar, said second outer metal member defining a second annular gap between said stabilizer bar and an inner surface of said second outer metal member; and
  a second elastomeric bushing compressingly disposed within said second annular gap, an outer surface of said second elastomeric bushing being fixed to said inner surface of said second outer metal member and an inner surface of said second elastomeric bushing being fixed to said stabilizer bar during all rotation of said stabilizer bar with respect to said first outer metal member due to compression of said second elastomeric bushing.

10. The stabilizer bar assembly according to claim 9, wherein said first bushing assembly includes a first mounting strap secured to said first outer metal member and said second bushing assembly includes a second mounting strap secured to said second outer metal member.

11. A stabilizer assembly comprising:
  a stabilizer bar;
  a first bushing assembly attached to said stabilizer bar, said first bushing assembly comprising:
    a first outer metal member disposed around said stabilizer bar, said first outer metal member defining a first annular gap between said stabilizer bar and an inner surface of said first outer metal member; and
    a first elastomeric bushing compressingly disposed within said first annular gap, an outer surface of said first elastomeric bushing being fixed to said inner surface of said first outer metal member and an inner surface of said first elastomeric bushing being fixed to said stabilizer bar during all rotation of said stabilizer bar with respect to said first outer metal member due to compression of said first elastomeric bushing, wherein said percent compression is between 20% and 60%.

12. A stabilizer assembly comprising:

a stabilizer bar;

a first bushing assembly attached to said stabilizer bar, said first bushing assembly comprising:
- a first outer metal member disposed around said stabilizer bar, said first outer metal member defining a first annular gap between said stabilizer bar and an inner surface of said first outer metal member; and
- a first elastomeric bushing compressingly disposed within said first annular gap, an outer surface of said first elastomeric bushing being fixed to said inner surface of said first outer metal member and an inner surface of said first elastomeric bushing being fixed to said stabilizer bar during all rotation of said stabilizer bar with respect to said first outer metal member due to compression of said first elastomeric bushing, wherein said percent compression is between 35% and 50%.

13. A stabilizer bar assembly comprising:

a stabilizer bar;

a first bushing assembly attached to said stabilizer bar, said first bushing assembly comprising:
- a first elastomeric bushing engaging said stabilizer bar; and
- a first outer metal member disposed around said stabilizer bar in engagement with said first elastomeric bushing, said first elastomeric bushing being compressed by said first outer metal member to a first prespecified percent of compression, said first prespecified percent of compression fixing an inner surface of said first elastomeric bushing to said stabilizer bar and fixing an outer surface of said first elastomeric bushing to said first outer metal member during all rotation of said stabilizer bar with respect to said first outer metal member.

14. The stabilizer bar assembly according to claim 13, wherein said first bushing assembly includes a mounting strap secured to said first outer metal member.

15. The stabilizer bar assembly according to claim 13, further comprising a second bushing assembly attached to said stabilizer bar, said second bushing assembly comprising:
- a second elastomeric bushing disposed around said stabilizer bar; and
- a second outer metal member disposed around said second elastomeric bushing, said second elastomer bushing being compressed by said second outer metal member to a second prespecified percent of compression, said second prespecified percent of compression fixing an inner surface of said second elastomeric bushing to said stabilizer bar and fixing an outer surface of said second elastomeric bushing to said second outer metal member during all rotation of said stabilizer bar with respect to said second outer metal member.

16. The stabilizer bar assembly according to claim 15, wherein said first bushing assembly includes a first mounting strap secured to said first outer metal member and said second bushing assembly includes a second mounting strap secured to said second outer metal member.

17. A stabilizer bar assembly comprising:

a stabilizer bar;

a first bushing assembly attached to said stabilizer bar, said first bushing assembly comprising:
- a first elastomeric bushing disposed around said stabilizer bar; and
- a first outer metal member disposed around said first elastomeric bushing, said first elastomeric bushing being compressed by said first outer metal member to a first prespecified percent of compression, said first prespecified percent of compression fixing an inner surface of said first elastomeric bushing to said stabilizer bar and fixing an outer surface of said first elastomeric bushing to said first outer metal member during all rotation of said stabilizer bar with respect to said first outer metal member, wherein said percent compression is between 20% and 60%.

18. A stabilizer bar assembly comprising:

a stabilizer bar;

a first bushing assembly attached to said stabilizer bar, said first bushing assembly comprising:
- a first elastomeric bushing disposed around said stabilizer bar; and
- a first outer metal member disposed around said first elastomeric bushing, said first elastomeric bushing being compressed by said first outer metal member to a first prespecified percent of compression, said first prespecified percent of compression fixing an inner surface of said first elastomeric bushing to said stabilizer bar and fixing an outer surface of said first elastomeric bushing to said first outer metal member during all rotation of said stabilizer bar with respect to said first outer metal member, wherein said percent compression is between 35% and 50%.

19. A stabilizer bar assembly comprising:

a stabilizer bar;

a first bushing assembly attached to said stabilizer bar, said first bushing assembly comprising:
- a first outer metal member disposed around said stabilizer bar; and
- a first elastomeric bushing compressed between said first outer metal member and said stabilizer bar, said first elastomeric bushing having a percent compression between 20% and 60%.

20. A stabilizer bar assembly according to claim 19, wherein said percent compression is between 35% and 50%.

21. The stabilizer bar assembly according to claim 19, wherein said first bushing assembly includes a mounting strap secured to said first outer metal.

22. The stabilizer bar assembly according to claim 19, further comprising a second bushing assembly attached to said stabilizer bar, said second bushing assembly comprising:
- a second outer metal member disposed around said stabilizer bar; and
- a second elastomeric bushing disposed between said second outer metal member and said stabilizer bar, said second elastomeric bushing having a prespecified percent compression such that all rotation between said stabilizer bar and said second outer metal member causes only deflection of said second elastomeric bushing.

23. The stabilizer bar assembly according to claim 22, wherein said first bushing assembly includes a first mounting strap secured to said first outer metal and said second bushing assembly includes a second mounting strap secured to said second outer metal.

24. A method of assembling a stabilizer bar, said method comprising:

providing a stabilizer bar;

providing an interference fit directly between said stabilizer bar and an annular bushing;

positioning said annular bushing around said stabilizer bar, said interference fit maintaining said position of said annular bushing around said stabilizer bar; and assembling an outer annular metal member around said annular bushing and around said stabilizer bar by compressing said annular bushing directly between said stabilizer bar and said outer annular metal member.

25. The method of assembling a stabilizer bar according to claim 24, further comprising securing a mounting strap to said outer annular metal member.

26. A method of assembling a stabilizer bar, said method comprising:

providing a stabilizer bar;

providing an interference fit between said stabilizer bar and an annular bushing;

positioning said annular bushing on said stabilizer bar, said interference fit maintaining said position of said annular bushing on said stabilizer bar; and assembling an outer annular metal member over said annular bushing and said stabilizer bar by compressing said annular bushing between said stabilizer bar and said outer annular metal member, wherein said assembling step includes compressing said annular bushing to a percent compression between 20% and 60%.

27. A method of assembling a stabilizer bar, said method comprising:

providing a stabilizer bar;

providing an interference fit between said stabilizer bar and an annular bushing;

positioning said annular bushing on said stabilizer bar, said interference fit maintaining said position of said annular bushing on said stabilizer bar; and assembling an outer annular metal member over said annular bushing and said stabilizer bar by compressing said annular bushing between said stabilizer bar and said outer annular metal member, wherein said assembling step includes compressing said annular bushing to a percent compression between 35% and 50%.

\* \* \* \* \*